US008693483B2

(12) United States Patent
Murray et al.

(10) Patent No.: US 8,693,483 B2
(45) Date of Patent: Apr. 8, 2014

(54) ADJUSTING MSS OF PACKETS SENT TO A BRIDGE DEVICE POSITIONED BETWEEN VIRTUAL AND PHYSICAL LANS

(75) Inventors: Elizabeth Jean Murray, Austin, TX (US); Jorge Rafael Nogueras, Austin, TX (US); Vasu Vallabhaneni, Austin, TX (US); Venkat Venkatsubra, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1453 days.

(21) Appl. No.: 11/945,651

(22) Filed: Nov. 27, 2007

(65) Prior Publication Data

US 2009/0135840 A1 May 28, 2009

(51) Int. Cl.
*H04L 12/56* (2011.01)
(52) U.S. Cl.
USPC .......................................................... 370/401
(58) Field of Classification Search
None
See application file for complete search history.

(56) References Cited

U.S. PATENT DOCUMENTS

| 5,809,254 | A | 9/1998 | Matsuzono |
|---|---|---|---|
| 7,042,907 | B2 | 5/2006 | Matsunaga |
| 7,304,959 | B1 | 12/2007 | Swaroop et al. |
| 7,317,692 | B2 | 1/2008 | Jason, Jr. et al. |
| 7,394,769 | B2 | 7/2008 | Banerjee et al. |
| 7,451,227 | B2 | 11/2008 | Lee et al. |
| 7,471,681 | B2 | 12/2008 | Jason et al. |
| 7,474,619 | B2 | 1/2009 | Baratakke et al. |
| 7,483,376 | B2 | 1/2009 | Banerjee et al. |
| 7,505,484 | B2 | 3/2009 | Pancholi et al. |
| 7,978,681 | B2 | 7/2011 | Chung et al. |
| 8,422,501 | B2 | 4/2013 | Das et al. |
| 2002/0141448 | A1* | 10/2002 | Matsunaga ................... 370/469 |
| 2005/0281288 | A1 | 12/2005 | Banerjee et al. |
| 2006/0018315 | A1 | 1/2006 | Baratakke et al. |
| 2006/0045131 | A1 | 3/2006 | Pancholi et al. |
| 2006/0123204 | A1* | 6/2006 | Brown et al. ................. 711/153 |
| 2007/0136481 | A1 | 6/2007 | Dierks, Jr. et al. |
| 2008/0008183 | A1 | 1/2008 | Takagaki et al. |
| 2008/0101382 | A1 | 5/2008 | Bannerjee et al. |

FOREIGN PATENT DOCUMENTS

WO    WO2006070542 A1    7/2006

OTHER PUBLICATIONS

U.S. Appl. No. 11/553,020, filed Oct. 26, 2006, Banerjee et al.
U.S. Appl. No. 11/619,676, filed Jan. 4, 2007, Das et al.

(Continued)

*Primary Examiner* — Yong Zhou
(74) *Attorney, Agent, or Firm* — Yee & Associates, P.C.; David A. Mims, Jr.

(57) ABSTRACT

A method and apparatus are provided for use with a SEA or other bridge device, which is positioned between virtual and physical LANS and is adapted to monitor connection setup packets. If the SEA detects such a packet, it determines whether it can accommodate the MSS value listed in the packet. In one embodiment, a method is provided for implementation by a bridge device positioned to transfer data packets between a specified LPAR system arid a specified host. The method comprises the step of detecting a packet that is transmitted to the bridge device, in order to set up a connection between the LPAR system and the host. The method further comprises determining whether the detected packet indicates an initial MSS value for the connection that is greater than a prespecified MSS value. Upon determining that the detected packet indicates an initial MSS value that exceeds the prespecified MSS value, the packet is altered to establish the prespecified MSS value as the MSS value for the connection.

20 Claims, 3 Drawing Sheets

(56) References Cited

OTHER PUBLICATIONS

Non-final office action dated Feb. 26, 2009 regarding U.S. Appl. No. 11/553,020, 19 pages.
Final office action dated Oct. 25, 2010 regarding U.S. Appl. No. 11/619,676, 15 pages.
Final office action dated Jun. 16, 2011 regarding U.S. Appl. No. 11/619,676, 15 pages.
Final office action dated Jun. 19, 2012 regarding U.S. Appl. No. 11/619,676, 15 pages.
Non-final office action dated Oct. 6, 2011 regarding U.S. Appl. No. 11/619,676, 14 pages.
Non-final office action dated Feb. 9, 2011 regarding U.S. Appl. No. 11/619,676, 15 pages.
Non-final office action dated Jul. 8, 2009 regarding U.S. Appl. No. 11/619,676, 13 pages.
Notice of allowance dated Nov. 14, 2012 regarding U.S. Appl. No. 11/619,676, 5 pages.
Mogul et al., "Path MTU DiscoverY," Network Working Group Request for Comments, Nov. 1990, 19 pages.

* cited by examiner

ADJUSTING MSS OF PACKETS SENT TO A BRIDGE DEVICE POSITIONED BETWEEN VIRTUAL AND PHYSICAL LANS

BACKGROUND OF THE INVENTION

1. Field of the Invention

The invention disclosed and claimed herein generally pertains to a method wherein a bridge or switch device is positioned to transfer data between virtual and physical local area networks (LANs). More particularly, the invention pertains to method of the above type wherein the bridge device must determine or assess the MSS of packet frames to be transferred, and if necessary adjust the maximum allowable MSS to a prespecified value. Even more particularly, the invention pertains to a method of the above type wherein the virtual LAN includes a logical partition (LPAR) system, and the bridge device can comprise a shared ethernet adapter (SEA).

2. Description of the Related Art

It is increasingly common for large, symmetric multi-processor systems to be partitioned and used as smaller systems, which are also referred to as logical partitioned data processing systems A logical partitioned functionality within a data processing system allows multiple copies of a single operating system, or multiple heterogeneous operating systems, to be simultaneously run on a single data processing system platform. A logical partition (LPAR), within which an operating system image runs, is assigned a non-overlapping subset of the platform resources. These resources can be allocated, and may include one or more architecturally distinct processors and their interrupt management areas, regions of system memory, and input/output (I/O) adapter bus slots.

In a virtualized environment such as an LPAR system environment, switches are implemented in software, A shared ethernet adapter (SEA) is a software bridge or switch that connects LPAR systems to hosts in the outside world, through virtual ethernet adapters. As is known by those of skill in the art, the maximum segment size (MSS) of a connection is the maximum amount of data, or packet size, that can be transmitted over that connection. Within the virtualized environment, the MSS of any connection will typically be 63K bytes. However, for hosts that are outside of the virtualized environment, ethernet hardware may accept frames of variable size, but typically not larger than 9000 bytes. Some ethernet hardware will accept frames of up to only 1500 bytes.

When a connection is established between two hosts, the MSS for the connection is the minimum Maximum Transmission Unit (MTU) of both the endpoint hosts involved in the connection. The Transmission Control Protocol (TCP) estimates MSS by using the MTU for each of these endpoints, in order to prevent either endpoint from sending data packets that are too large for the other. While this method of estimating MSS takes into account the MTU of both sender and receiver, it does not consider the MTU of any hosts or switches that lie between the two endpoints. As a result, a misconfiguration is likely to occur, when an LPAR sets up a connection with an outside host that supports 9000 byte frames, but the SEA that bridges the LPAR to the outside host can reliably accept packet frames of only up to 1500 bytes. In this arrangement, the LPAR and the outside host establish a connection with incident, if the packets used to set up the connection do not exceed 1500 bytes. The setup packets will indicate that an MSS of 9000 is acceptable, since data transmission begins under the assumption that each host can accept packet frames of at least 9000 bytes of data. However, when the data travels from the outside host to the LPAR, the physical hardware attached to the SEA will drop the packet. Thus, while a connection does become established, it is totally non-functioning.

SUMMARY OF THE INVENTION

In the invention, a SEA or other bridge device positioned between a virtual and a physical LAN is set to monitor connection setup packets. If the SEA detects such a packet, it determines whether it can accommodate the MSS value listed in the packet. If it cannot, do so, the SEA alters the packet so that the MSS is the MSS value of hardware attached to or associated with the SEA. In one embodiment of the invention, a method is provided for implementation by a bridge device that is positioned to transfer data packets between a specified LPAR system arid a specified host. The method comprises the step of detecting a packet that is transmitted to the bridge device, in order to set up a connection between the LPAR system and the host. The method further comprises determining whether the detected packet indicates an initial MSS value for the connection that is greater than a prespecified MSS value. Upon determining that the detected packet indicates an initial MSS value that exceeds the prespecified MSS value, the packet is altered to establish the prespecified MSS value as the MSS value for the connection.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
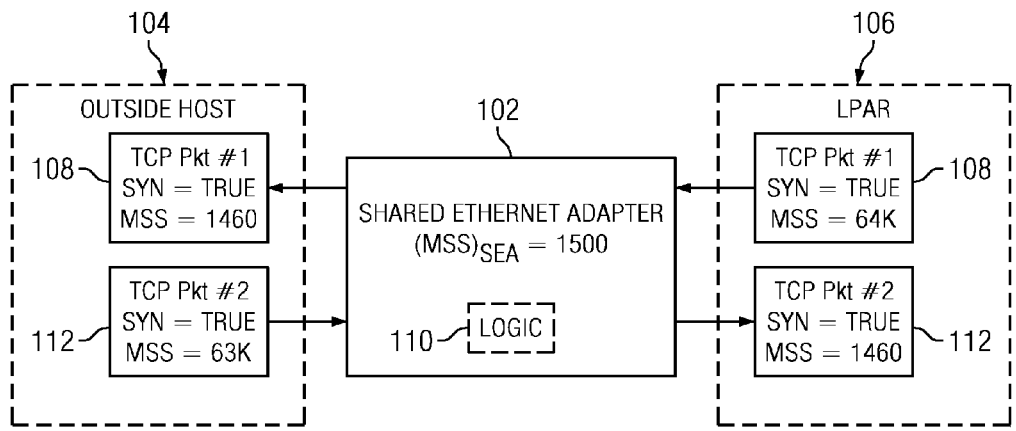
FIG. 1 is a block diagram showing an SEA connected between a virtual host and a physical host for implementing an embodiment of the invention.

Referring to FIG. 1, there is shown a bridge or switch device 102, comprising a shared ethernet adapter (SEA) and connected between an outside host 104 and an LPAR 106. LPAR 106 is associated with a platform comprising a multi-processor data processing system, and is included in a virtualized local area network. Host 104 comprises a physical device, such as a computer system included in a physical LAN, and is thus outside the virtual environment of LPAR 106.

SEA 102 comprises a software bridge provided to transfer data packets between host 104 and LPAR 106, after a TCP connection has been established therebetween. The SEA is associated with a physical ethernet adapter connected to the data processing system of the LPAR 106, as shown hereinafter for example by FIG. 4, SEA 104 is configured by operation of a hardware management console (HMC), which may be implemented using such data processing system. FIG. 1 further shows SEA 102 provided with a logic component 110, for carrying out respective steps of an embodiment of the invention as described hereinafter.

A TCP connection is set up between host 104 and LPAR 106, through the SEA 102, by following a conventional procedure. Either host 104 or LPAR 106 may be the sender, whereupon the other is the receiver. Initially, the sender sends a synchronous (SYN) packet, which is received by the SEA 102 and transmitted thereby to the receiver. Upon receipt of the SYM packet, the receiver sends a synchronous-acknowledgement (SYH-ACK) packet to SEA 102 to the sender. The sender then sends an ACK packet through SEA 102 to the receiver, whereupon the connection is established. If the SYN bit of the SYN packet is set to true, the packet may have a field containing an MSS value, wherein such MSS value indicates the maximum segment size of a TCP packet that can reliably be handled by the receiver.

In accordance with the embodiment of the invention, the logic component 110 of SEA 102 directs the SEA to take a series of actions, whenever the SEA accepts the packet from either host 104 or LPAR 106. Upon receiving a packet, the SEA will first check to determine whether it is an IP packet. If it is, then the SEA 102 checks the protocol field of the packet IP header, and accepts the IP packet only if it contains TCP data. Finally, if the packet is a TCP packet, SEA 102 determines whether the SYN bit of the packet is set. If any of these determinations is negative, SEA 102 passes the packet to the receiver without alteration, If the packet proves to be a TCP packet with the SYN bit set or true, the logic 110 of SEA 102 is operable to determine whether or not the packet contains a field that has an MSS value. If not, the SEA again passes the packet without altering it. However, if the packet does contain an MSS value, logic 110 compares this value with a value $(MSS)_{SEA}$. The value $(MSS)_{SEA}$ indicates the maximum segment size that can be supported by hardware attached to and associated with SEA 102. If the MSS value of the packet does not exceed $(MSS)_{SEA}$, the SEA 102 again takes no action, and sends the packet along to the intended receiver without alteration.

In the event that the MSS value of the SEA packet is found, to he greater than $(MSS)_{SEA}$, SEA 102 changes the packet MSS, so that the MSS field thereof indicates a value that is equal to or slightly less than $(MSS)_{SEA}$. As a result, after a connection has been established between host 104 and LPAR 106 that is directed through SEA 102, only packets that are no greater than $(MSS)_{SEA}$, and thus small enough to be supported by SEA 102, will be sent thereto, SEA 102 also changes the checksum of the packet in accordance with the new MSS, so that the updated checksum will be valid for the value $(MSS)_{SEA}$ rather than the prior MSS value.

Figure 2:
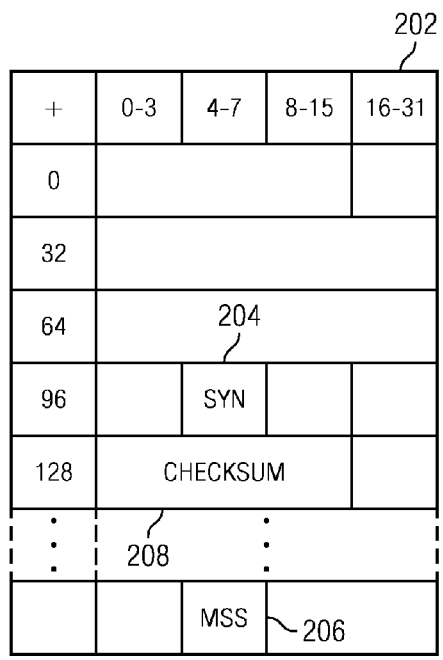
FIG. 2 is a schematic representation of a packet used in connection with the embodiment of FIG. 1.

Referring to FIG. 2, there is shown a schematic representation of a TCP packet header 202, which contains a SYN flag or control bit 204, a field 206 that contains an MSS value, and a checksum field 208.

Referring further to FIG. 1, there is shown a packet 108 by way of example, also referred to as TCP Pkt #1, that is sent from LPAR 106 to host 104, as part of a process to set up a connection therebetween. THE SYN bit of sent packet 108 is set, and the MSS value thereof is 64k bytes. However, the maximum MSS value that can be reliably accepted by SEA 102 is 1500bytes. Accordingly, upon receiving the packet 108, SEA 102 changes the MSS value indicated thereby to 1460 bytes, before routing the packet on to host 104. Thus, after the connection has been established, no packet exceeding 1460 bytes in size will be sent through SEA 102.

Similarly, FIG. 1 shows a packet 112, also referenced as TCP Pkt #2, that is sent from host 104 to set up a connection between host 104 and LPAR 106. In this case, the MSS value of the sent packet 112 is 63k bytes. Again, SEA 102 changes the MSS value of the incoming packet to indicate an MSS value of 1460 bytes, before routing the packet on to LPAR 106.

Figure 3:
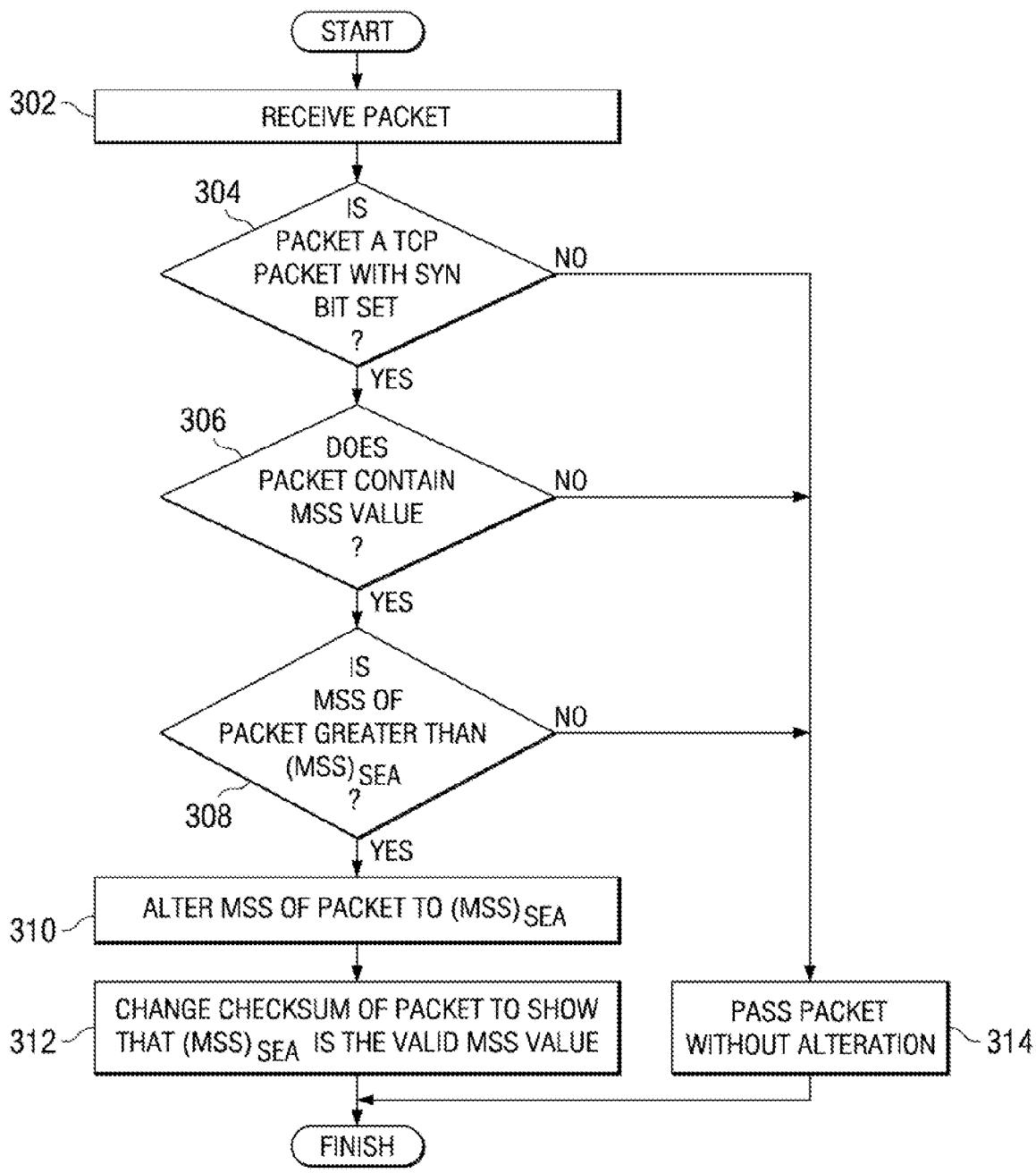
FIG. 3 is a flowchart showing principal steps for an embodiment of the invention.

Referring to FIG. 3, there is shown a flowchart depicting steps of the embodiment of the invention as described above. After receiving a packet at step 302, the SEA determines whether or not the packet is a TCP packet having a SYU bit that is set. A positive result for this step indicates that the packet is intended to establish a connection between two hosts, such as host 104 and LPAR 106 in FIG. 1. Accordingly, when the result is positive, the SEA proceeds at step 306 to determine whether the packet contains an MSS value. If it does, the SEA compares such value with the $(MSS)_{SEA}$ value, at step 308, to query whether the MSS value of the received packet is greater than
$(MSS)_{SEA}$.

If the MSS value of the received packet is found to exceed $(MSS)_{SEA}$, the SEA changes the MSS value, as initially shown by the packet, to $(MSS)_{SEA}$. Thus, the MSS value for the connection is adjusted to the maximum value that the SEA hardware can support. At step 312, the checksum of the packet is changed or updated to a value that can subsequently be used to show that $(MSS)_{SEA}$ is the valid MSS value for the established connection.

Referring further to FIG. 3, if a negative result is produced at any of the steps 304, 306 or 308, the SEA passes the received packet without alteration. This is shown at step 314.

Figure 4:
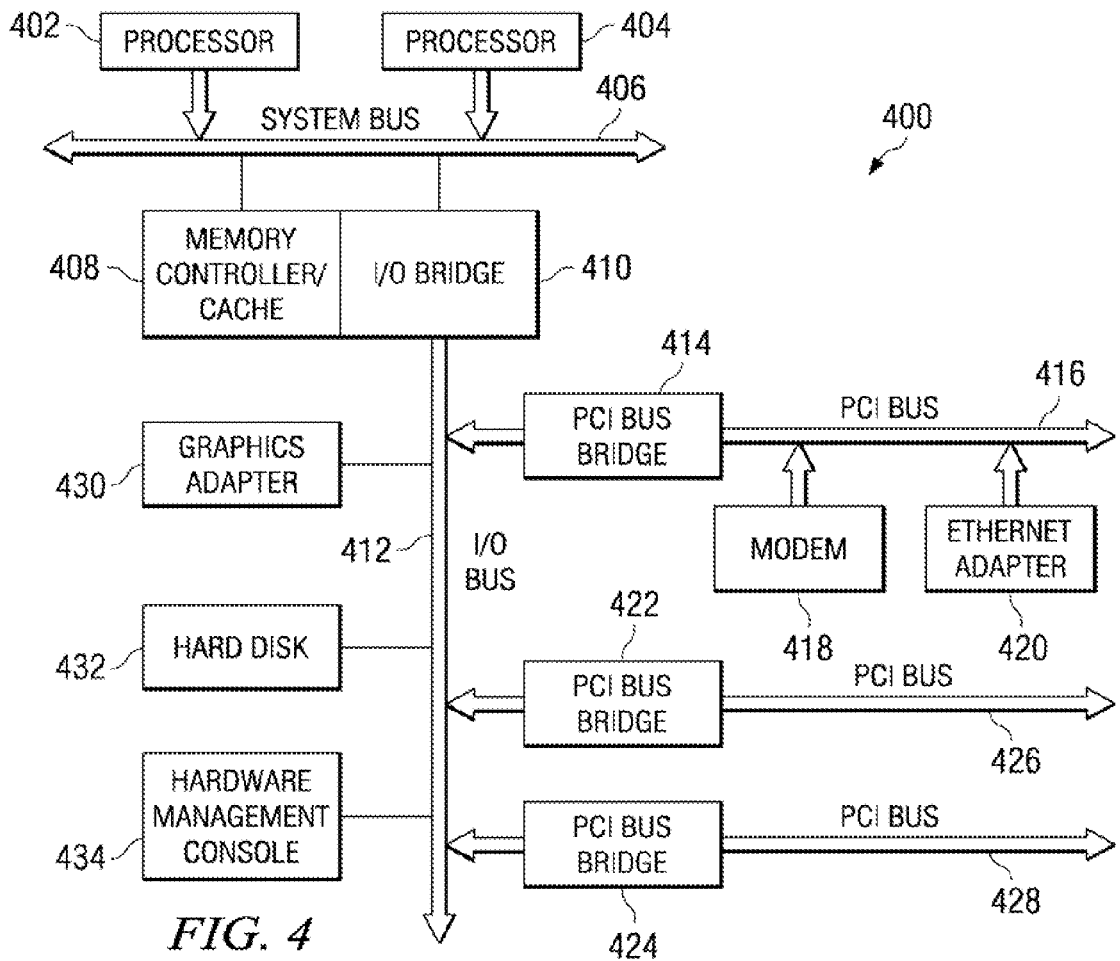
FIG. 4 is a block diagram showing a data processing system that may be configured to provide a SEA and an LPAR in connection with FIG. 1.

Referring to FIG. 4, there is shown a block diagram depicting a data processing system 400 that may be partitioned to provide LPAR 106, and may also foe used to provide SEA 102 and further implement embodiments of the invention. Data processing system 400 may be a symmetric multiprocessor (SHP) system including a plurality of processors 402 and 404 connected to system bus 406. Also connected to system bus 406 is memory controller/cache 408, I/O bus bridge 410 is connected to system bus 406 and provides an interface to I/O bus 412. Memory controller/cache 408 and I/O bus bridge 410 may be integrated as depicted.

Peripheral component interconnect (PCI) bus bridge 414 connected to I/O bus 412 provides an interface to PCI local bus 416. A number of modems may be connected to PCI bus 416. Typical PCI bus implementations will support four PCI expansion slots or add-in connectors. Communications links may be provided through modem 418 and a physical ethernet adapter 420 connected to PCI local bus 416 through add-in boards. The SEA 102 may be configured using adapter 420, together with hardware management console (HMO 434 that is associated with system 400.

Additional PCI bus bridges 422 and 424 provide interfaces for additional PCI buses 426 and 428, from which additional modems or network adapters may be supported. In this manner, data processing system 400 allows connections to multiple network computers. A memory-mapped graphics adapter 430 and hard disk 432 may also be connected to I/O bus 412 as depicted, either directly or indirectly. The depicted example is not meant to imply architectural limitations with respect to the present invention. The data processing system depicted in FIG. 4 may be, for example, an IBM RISC/System 6000 system, a product of International Business Machines Corporation in Armonk, N.Y., running the Advanced Interactive Executive (AIX) operating system, Alternatively, the operating system may toe another commercially available operating system such as JavaOS For BusinessÔ or OS/2Ô, which are also available from IBM.

Figure 5:
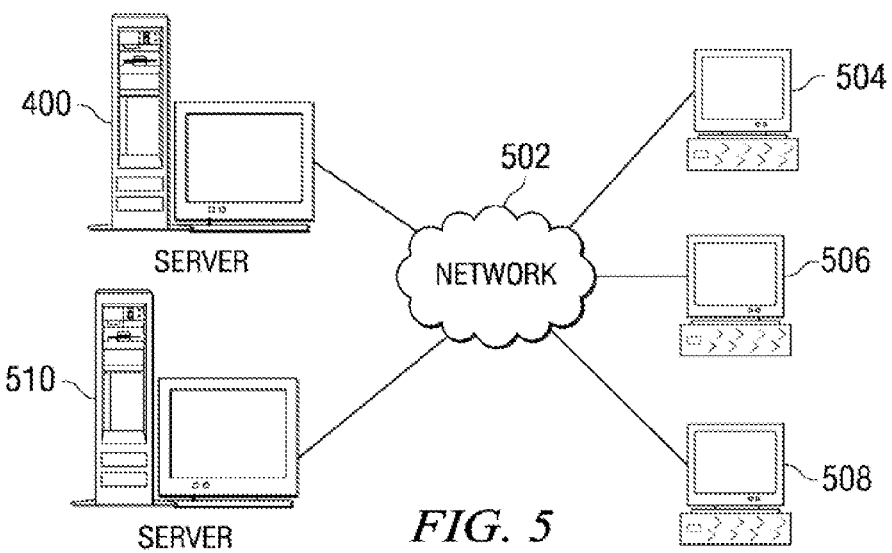
FIG. 5 is a schematic diagram depicting a network environment in which components of FIG. 1 may be used.

Referring to FIG. 5, there is shown data processing system 400, partitioned to provide LPAR 106 as described above, connected through a network 502 to computer systems 504-508. Network 502 may comprise the Internet or other network, and any of the computer systems 404-508 may comprise the host 104. Data processing system 400 is also connected through network 502 to a data processing system 510, which is similar or identical to system 400. Thus, system 510 could provide a platform for a number of LPARs, any of which could be connected to LPAR 106 by means of an embodiment of the invention.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc, Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for implementation by a bridge device that is positioned to transfer data packets between a specified logical partition (LPAR) system and a specified host, wherein said method comprises the steps of:
   detecting a packet transmitted to said bridge device in order to set up a connection between said LPAR system and said host, wherein said packet is transmitted by a transmitting component for said connection, said transmitting component comprises, selectively, one of said LPAR system or said host, and a receiving component for said connection comprises the other of said LPAR system or said host, and said transmitted packet has a maximum segment size (MSS) value that indicates an initial MSS value for the connection;
   determining whether said detected packet has an MSS value that is greater than, equal to or less than a prespecified MSS value wherein said prespecified MSS value is equal to the maximum size of packet frames that can be supported by said bridge device; and
   responsive to determining that said detected packet has an MSS value that is greater than said prespecified MSS value, preventing said transmitting component from sending packets to said bridge device that have MSS values which exceed said prespecified MSS value, and altering said detected packet to establish said prespecified MSS value as the MSS value for said connection.

2. The method of claim 1, wherein:
   said transmitting component has an MSS value equal to a first MSS value, said detected packet has an MSS value that is likewise equal to said first MSS value, said receiving component has an MSS value equal to a second MSS value that is less than said first MSS value, and responsive to determining that said first MSS value of said detected packet does not exceed said prespecified MSS value, said bridge device takes no action, and sends said detected packet to said receiving component without alteration.

3. The method of claim 1, wherein:
   after alteration of said packet MSS value to said prespecified MSS value, said bridge device is further operated to update a checksum value to show validity for an MSS value comprising said prespecified MSS value.

4. The method of claim 1, wherein:
   said transmitting component has an MSS value equal to a first MSS value, said detected packet has an MSS value that is likewise equal to said first MSS value, said receiving component has an MSS value equal to a second MSS value, and it is determined that said first MSS value and said second MSS value are each greater than said prespecified MSS value of said bridge device.

5. The method of claim 1, wherein:
   said bridge device is provided with logic for carrying out said detecting, determining and altering steps, respectively.

6. The method of claim 1, wherein:
   detection of said packet comprises confirming, respectively, that said packet is an IP packet, that said packet contains TCP data, and that said packet has a synchronization (SYN) bit that is set.

7. The method of claim 6, wherein:
said packet is transmitted as part of a procedure wherein a sender sends said SYN packet to a receiver, said receiver responds to the SYN packet by sending a synchronous-acknowledgement (SYN-ACK) packet to the sender, and the sender then sends an ACK packet to the receiver, wherein either said LPAR system or said host is the sender, and the other is the receiver.

8. The method of claim 1, wherein:
said bridge device comprises a shared ethernet adapter.

9. The method of claim 1, wherein:
said bridge comprises a hardware device.

10. The method of claim 1, wherein:
said specified host comprises, selectively, an outside host, or an LPAR system having a platform that is different from the platform of said specified LPAR system.

11. A computer program product in a computer readable non-transitory medium for use with a bridge device that is positioned to transfer data packets between a specified logical partition (LPAR) system and a specified host, wherein said computer program product comprises:
first instructions for detecting a packet transmitted to said bridge device in order to set up a connection between said LPAR system and said host, wherein said packet is transmitted by a transmitting component for said connection, said transmitting component comprises, selectively, one of said LPAR system or said host, and a receiving component for said connection comprises the other of said LPAR system or said host, and said transmitted packet has a maximum segment size (MSS) value that indicates an initial MSS value for the connection;
second instructions for determining whether said detected packet has an MSS value that is greater than, equal to or less than a prespecified MSS value, wherein said prespecified MSS value is equal to the maximum size of packet frames that can be supported by said bridge device; and
third instructions, responsive to determining that said detected packet has an MSS value that is greater than said prespecified MSS value, for preventing said transmitting component from sending packets to said bridge device that have MSS values which exceed said prespecified MSS value, and altering said detected packet to establish said prespecified MSS value as the MSS value for said connection.

12. The computer program product of claim 11, wherein:
said transmitting component has an MSS value equal to a first MSS value, said detected packet has an MSS value that is likewise equal to said first MSS value, said receiving component has an MSS value equal to a second MSS value, that is less than said first MSS value, and responsive to determining that said first MSS value of said detected packet does not exceed said prespecified MSS value, said bridge device takes no action, and sends said detected packet to said receiving component without alteration.

13. The computer program product of claim 11, wherein:
after alteration of said packet MSS value to said prespecified MSS value, said bridge device is further operated to update a checksum value to show validity for an MSS value comprising said prespecified MSS value.

14. The computer program product of claim 11, wherein:
said transmitting component has an MSS value equal to a first MSS value, said detected packet has an MSS value that is likewise equal to said first MSS value, said receiving component has an MSS value equal to a second MSS value, and it is determined that said first MSS value and said second MSS value are each greater than said prespecified MSS value of said bridge device.

15. The computer program product of claim 11, wherein:
said bridge device comprises a shared ethernet adapter, and is provided with logic for carrying out said detecting, determining and altering steps, respectively.

16. An apparatus for use with a bridge device that is positioned to transfer data packets between a specified logical partition (LPAR) system and a specified host, wherein said apparatus comprises:
a first component for detecting a packet transmitted to said bridge device in order to set up a connection between said LPAR system and said host, wherein said packet is transmitted by a transmitting component for said connection, said transmitting component comprises, selectively, one of said LPAR system or said host, and a receiving component for said connection comprises the other of said LPAR system or said host, and said transmitted packet has a maximum segment size (MSS) value that indicates an initial MSS value for the connection;
a second component for determining whether said detected packet has an MSS value that is greater than, equal to or less than a prespecified MSS value, wherein said prespecified MSS value is equal to the maximum size of packet frames that can be supported by said bridge device; and
a third component, responsive to determining that said detected packet has an MSS value that is greater than said prespecified MSS value, for preventing said transmitting component from sending packets to said bridge device that have MSS values which exceed said prespecified MSS value, and for altering said detected packet to establish said prespecified MSS value as the MSS value for said connection.

17. The apparatus of claim 16, wherein:
said transmitting component has an MSS value equal to a first MSS value, said detected packet has an MSS value that is likewise equal to said first MSS value, said receiving component has an MSS value equal to a second MSS value, that is less than said first MSS value, and responsive to determining that said first MSS value of said detected packet does not exceed said prespecified MSS value, said bridge device takes no action, and sends said detected packet to said receiving component without alteration.

18. The apparatus of claim 16, wherein:
after alteration of said packet MSS value to said prespecified MSS value, said bridge device is further operated to update a checksum value to show validity for an MSS value comprising said prespecified MSS value.

19. The apparatus of claim 16, wherein:
said transmitting component has an MSS value equal to a first MSS value, said detected packet has an MSS value that is likewise equal to said first MSS value, said receiving component has an MSS value equal to a second MSS value, and it is determined that said first MSS value and said second MSS value are each greater than said prespecified MSS value of said bridge device.

20. The apparatus of claim 16, wherein:
said bridge device comprises a hardware device, and is provided with logic for carrying out said detecting, determining and altering steps, respectively.

* * * * *